US011161622B2

(12) United States Patent
Andrews, Jr. et al.

(10) Patent No.: US 11,161,622 B2
(45) Date of Patent: Nov. 2, 2021

(54) FUEL OXYGEN REDUCTION UNIT

(71) Applicant: General Electric Company, Schenectady, NY (US)

(72) Inventors: Peter Allen Andrews, Jr., Cincinnati, OH (US); Ethan Patrick O'Connor, Hamilton, OH (US); Daniel Alan Niergarth, Norwood, OH (US); Brandon Wayne Miller, Liberty Township, OH (US); Christian Xavier Stevenson, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 16/179,124

(22) Filed: Nov. 2, 2018

(65) Prior Publication Data
US 2020/0140114 A1 May 7, 2020

(51) Int. Cl.
*B64D 37/34* (2006.01)
*F02C 7/224* (2006.01)
*F02C 7/22* (2006.01)
*F02M 37/22* (2019.01)
*B01D 19/00* (2006.01)

(52) U.S. Cl.
CPC ............. *B64D 37/34* (2013.01); *F02C 7/222* (2013.01); *F02C 7/224* (2013.01); *F02M 37/22* (2013.01); *B01D 19/0063* (2013.01); *B01D 2257/104* (2013.01)

(58) Field of Classification Search
CPC ................ B01D 3/343; B01D 19/0005; B01D 19/0063; B01D 2257/104; B64D 37/34; F02C 7/22; F23R 2900/00004
See application file for complete search history.

(56) References Cited

U.S. PATENT DOCUMENTS

| | | |
|---|---|---|
| 2,582,842 A | 1/1952 | Messinger |
| 2,720,313 A | 10/1955 | Pattison |
| 2,893,628 A | 7/1959 | Herman |
| 3,050,240 A | 8/1962 | Darnell |
| 3,178,105 A | 4/1965 | Darnell |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

U.S. Appl. No. 15/819,327, filed Nov. 28, 2017.

(Continued)

*Primary Examiner* — Scott J Walthour
(74) *Attorney, Agent, or Firm* — Dority & Manning, P.A.

(57) ABSTRACT

An engine includes a combustion section and a fuel delivery system in fluid communication with the combustion section for providing fuel to the combustion section. The fuel delivery system includes a fuel oxygen reduction unit defining a circulation gas flowpath. The fuel oxygen reduction unit includes a gas oxygen reduction unit positioned in the circulation gas flowpath for reducing an oxygen content of a flow of stripping gas through the circulation gas flowpath and a pre-heater positioned in thermal communication with the circulation gas flowpath upstream of the gas oxygen reduction unit.

20 Claims, 5 Drawing Sheets

(56) References Cited

U.S. PATENT DOCUMENTS

| | | |
|---|---|---|
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2003/0111627 A1* | 6/2003 | Winslow .................. F16K 3/267 251/206 |
| 2003/0185720 A1* | 10/2003 | Tom .................... B01D 53/9445 422/173 |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1* | 10/2011 | Limaye ................ B01D 53/864 422/129 |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0268431 A1* | 9/2017 | Schwarz .................. F02C 3/04 |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |

(56) References Cited

FOREIGN PATENT DOCUMENTS

WO     WO2006/079438 A1     8/2006
WO     WO2011/038188 A1     3/2011

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

* cited by examiner

FUEL OXYGEN REDUCTION UNIT

FIELD

The present subject matter relates generally to a fuel oxygen reduction unit for an engine or vehicle.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen reduction systems have been proposed for such a purpose. Certain of these fuel oxygen reduction systems may introduce a stripping gas to absorb or otherwise react with the fuel to reduce an oxygen content of the fuel.

The inventors of the present disclosure have found that an efficiency may be increased by reusing and recirculating the stripping gas. However, the inventors of the present disclosure have found the stripping gas may only absorb a certain amount of oxygen from the fuel during operation. As such, the inventors of the present disclosure have found that the stripping gas must be conditioned in order to facilitate its reuse. Accordingly, a fuel oxygen reduction unit capable of effectively reusing the stripping gas would be useful.

BRIEF DESCRIPTION

Aspects and advantages of the invention will be set forth in part in the following description, or may be obvious from the description, or may be learned through practice of the invention.

In one exemplary embodiment of the present disclosure, an engine is provided. The engine includes a combustion section and a fuel delivery system in fluid communication with the combustion section for providing fuel to the combustion section, the fuel delivery system including a fuel oxygen reduction unit defining a circulation gas flowpath. The fuel oxygen reduction unit includes a gas oxygen reduction unit positioned in the circulation gas flowpath for reducing an oxygen content of a flow of stripping gas through the circulation gas flowpath and a pre-heater positioned in thermal communication with the circulation gas flowpath upstream of the gas oxygen reduction unit.

In certain exemplary embodiments the engine further includes a compressor section, and wherein the fuel oxygen reduction unit further includes a makeup gas assembly in airflow communication with the compressor section of the engine and the circulation gas flowpath upstream of the gas oxygen reduction unit.

For example, in certain exemplary embodiments the compressor section includes a low pressure compressor and a high-pressure compressor, wherein the makeup gas assembly is in airflow communication with the high-pressure compressor for receiving a bleed airflow from the high-pressure compressor.

For example, in certain other exemplary embodiments the high-pressure compressor defines a reference point where an airflow therethrough reaches a reference temperature during operation, wherein the makeup gas assembly is in airflow communication with the high-pressure compressor at the reference point of the high-pressure compressor or downstream of the reference point of the high-pressure compressor, and wherein the reference temperature is greater than or equal to 350 degrees Fahrenheit.

For example, in certain other exemplary embodiments the high-pressure compressor includes at least four stages, and wherein the makeup gas assembly is in airflow communication with the high-pressure compressor at the fourth stage of the high-pressure compressor or downstream of the fourth stage of the high-pressure compressor.

For example, in certain exemplary embodiments the makeup gas assembly is in airflow communication with the circulation gas flowpath at the preheater or upstream of the preheater.

In certain exemplary embodiments the preheater includes an electric heater or a heat exchanger.

In certain exemplary embodiments the preheater includes a heat exchanger, wherein the compressor section and combustion section of the engine together define at least in part an engine flowpath, and wherein the heat exchanger is further in thermal communication with the engine flowpath or an engine system.

In certain exemplary embodiments the gas oxygen reduction unit is a catalyst, wherein the preheater includes a recirculating flowpath in airflow communication with the circulation gas flowpath downstream of the catalyst and the circulation gas flowpath upstream of the catalyst.

In certain exemplary embodiments the preheater is configured as a gas boost pump.

In certain exemplary embodiments the gas oxygen reduction unit is a catalyst, wherein the fuel oxygen reduction unit further includes a gas boost pump in airflow communication with the circulation gas flowpath at a location downstream of the catalyst.

In certain exemplary embodiments the gas oxygen reduction unit is a catalyst, wherein the fuel oxygen reduction unit further includes a contactor and a fuel gas separator, wherein the contactor is in airflow communication with circulation gas flowpath at a location downstream of the catalyst and is in fluid communication with a liquid fuel inlet line, and wherein the fuel gas separator is in fluid communication with the contactor and is in airflow communication with the circulation gas flowpath at a location upstream of the catalyst.

In certain exemplary embodiments the fuel oxygen reduction unit further includes a makeup gas assembly in airflow communication with the circulation gas flowpath upstream of the gas oxygen reduction, wherein the makeup gas assembly includes a makeup gas valve, and wherein the makeup gas valve is a pressure differential valve.

In another exemplary aspect of the present disclosure, a method for operating a fuel oxygen reduction unit of a gas turbine engine is provided. The method includes providing a flow of stripping gas through a circulation gas flowpath of the fuel oxygen reduction unit, the circulation gas flowpath extending between a fuel gas separator of the fuel oxygen reduction unit and a contactor of the fuel oxygen reduction unit; and heating the flow of stripping gas using a pre-heater of the fuel oxygen reduction unit at a location upstream of a gas oxygen reduction of the fuel oxygen reduction unit.

In certain exemplary aspects the method further includes providing a flow of makeup gas to the circulation gas flowpath upstream of the gas oxygen reduction.

For example, in certain exemplary aspects providing the flow of makeup gas to the circulation gas flowpath further includes providing the flow of makeup gas to the circulation gas flowpath from a compressor section of the gas turbine engine through a makeup gas assembly.

For example, in certain exemplary aspects the fuel oxygen reduction unit defines a maximum rated circulation gas flowpath flow rate, wherein providing the flow of makeup gas to the circulation gas flowpath includes providing a flow of makeup gas at a flow rate of between about 0.05 percent and about five percent of the maximum rated circulation gas flowpath flow rate.

For example, in certain exemplary aspects the method further includes receiving data indicative of an operating condition of the fuel oxygen reduction unit; and modifying an amount of heat added to the flow of stripping gas through the circulation gas flowpath with the preheater, modifying an amount of makeup gas provided by the makeup gas assembly to circulation gas flowpath, or both.

In certain exemplary aspects the gas oxygen reduction unit is a catalyst, and wherein the method further includes reducing an oxygen content of the flow stripping gas through the circulation gas flowpath utilizing the catalyst, and wherein reducing the oxygen content of the flow stripping gas through the circulation gas flowpath utilizing the catalyst includes providing the stripping gas flow through the catalyst at a flow rate of between about 0.01 pounds per second and about 0.2 pounds per second.

In certain exemplary aspects the gas oxygen reduction unit is a catalyst, wherein the catalyst defines an activation temperature, wherein heating the flow of stripping gas using the preheater includes heating the flow stripping gas to a temperature greater than or equal to the activation temperature at the location upstream of the catalyst.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
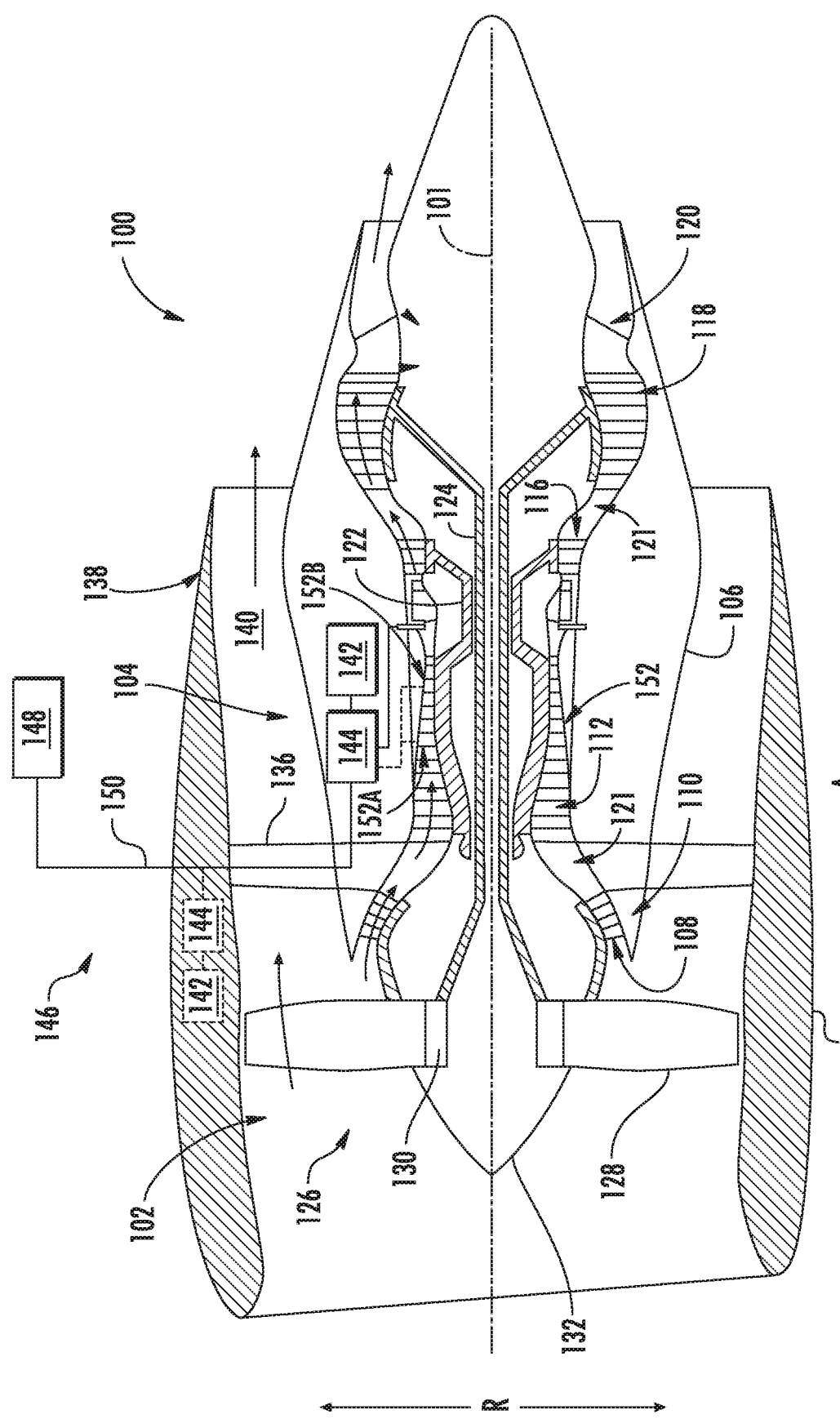
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142 and a fuel delivery system 146 having a fuel oxygen reduction unit 144. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142. Notably, as used herein, the term "fuel oxygen reduction unit" generally means a device capable of reducing a free oxygen content of the fuel, such as a fuel deoxygenation unit, a fuel oxygen conversion unit, etc.

Briefly, it will it will also be appreciated that the HP compressor 112 of the compressor section of the turbofan engine 100 includes a plurality of stages 152 of compressor rotor blades and compressor stator vanes. Particularly, for the embodiment shown, the HP compressor includes at least four (4) stages 152, such as at least six (6) stages 152, such as up to twenty (20) stages 20, and more particularly includes seven (7) stages 152 of compressor rotor blades and compressor stator vanes.

Referring still to FIG. 1, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. Notably, for the embodiment shown the exemplary fuel oxygen reduction unit 144 includes one or more components (such as a makeup gas assembly, as will be discussed in greater detail below) in airflow communication with the HP compressor 112 for receiving an airflow from the HP compressor 112. Particularly, as is depicted in phantom in FIG. 1, the exemplary fuel oxygen reduction unit 144 may be in airflow communication with the HP compressor 112 at the fourth stage 152A, or downstream of the fourth stage 152A, such as at the sixth stage 152B or downstream of the sixth stage 152B.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted the turbofan engine 100 includes the accessory gearbox 142 and fuel oxygen reduction unit 144 positioned within the turbomachine 104, i.e., within the casing 106 of the turbomachine 104, in other embodiments, the accessory gearbox 142 and fuel oxygen reduction unit 144 may be positioned at any other suitable location. For example, as is depicted in phantom in FIG. 1, in other embodiments, the accessory gearbox 142 and/or the fuel oxygen reduction unit 144 may be positioned within the nacelle 134 of the turbofan engine 100. Alternatively, in still other embodiments, the accessory gearbox 142 may be positioned with the turbofan engine 100 and the fuel oxygen reduction unit 144 may be positioned remote from the turbofan engine 100, such as proximate to, or within, the tank 148 of the fuel delivery system 146. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Figure 2:
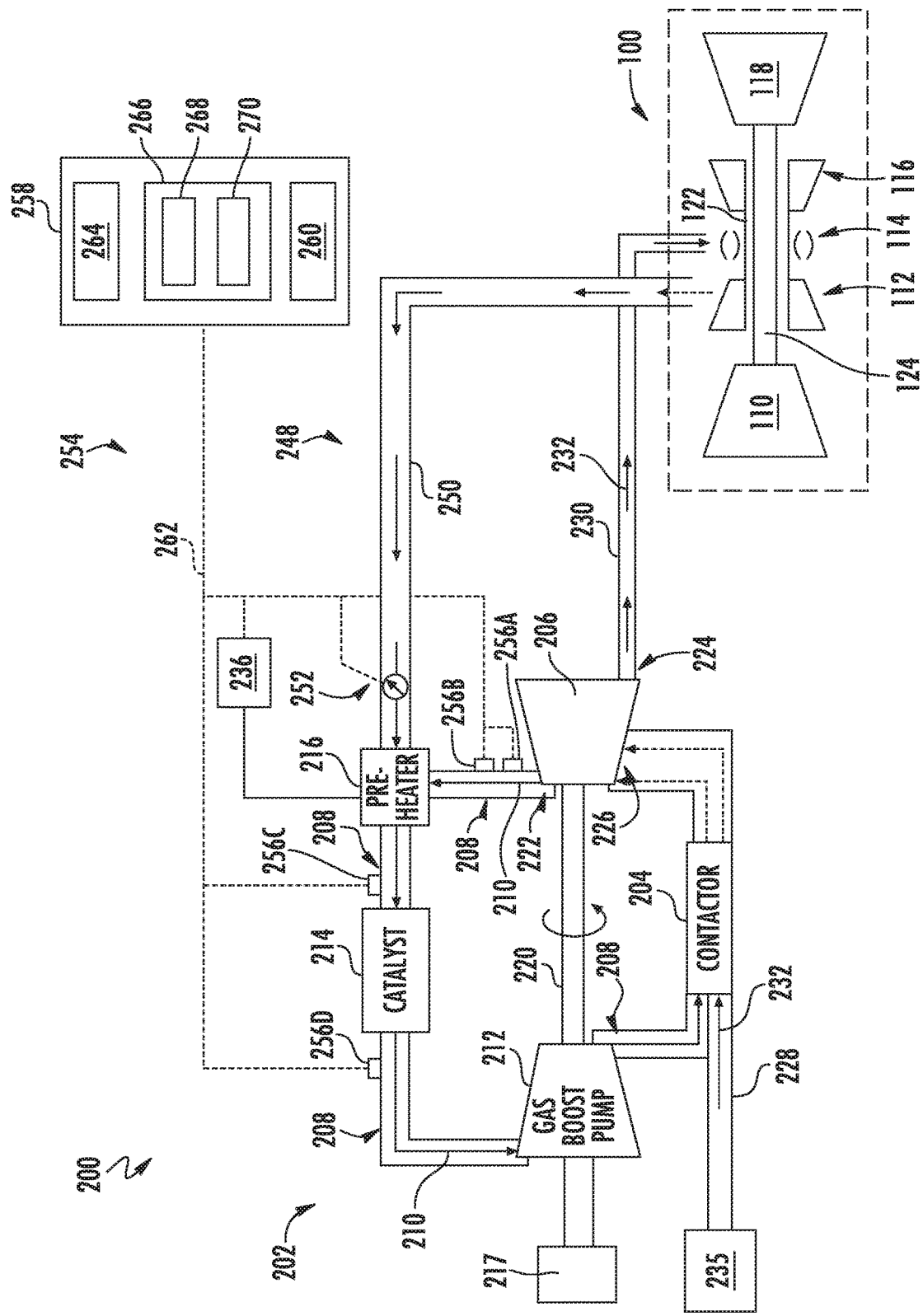
FIG. 2 is a schematic view of a fuel delivery system in accordance with an exemplary embodiment of the present disclosure.

Referring now to FIG. 2, a schematic drawing of a fuel delivery system 200 including a fuel oxygen reduction unit 202 in accordance with an exemplary aspect of the present disclosure is provided. In at least certain exemplary embodiments, the exemplary fuel delivery system 200 depicted in FIG. 2 may be incorporated into, e.g., the exemplary turbofan engine 100 described above with reference to FIG. 1 (e.g., may be the fuel delivery system 146 depicted in FIG. 1 and described above).

More specifically, the exemplary fuel delivery system 200 of FIG. 2 is operable with, e.g., included with, an engine 100. For the embodiment depicted in FIG. 2, the engine 100 is depicted schematically, and is configured as a gas turbine engine 100. The exemplary gas turbine engine 100 may be configured in a similar manner to the exemplary turbofan engine 100 described above with reference to FIG. 1. However, in other embodiments, any other combustion engine, such as any other suitable gas turbine engine, may be utilized with aspects of the present disclosure.

For example, the exemplary engine 100 depicted schematically generally includes a compressor section having a low pressure compressor 110 and a high pressure compressor 112; a combustion section 114; and a turbine section having a high pressure turbine 116 and a low pressure turbine 118. The exemplary fuel delivery system 200 is in fluid communication with the combustion section 114 for providing fuel to the combustion section 114. The high pressure compressor 112 and high pressure turbine 116 are coupled through a high pressure spool 122, and similarly, the low pressure compressor 110 and low pressure turbine 118 are coupled through a low pressure spool 124. It will be appreciated that in other embodiments, the exemplary gas turbine engine 100 may have any other suitable number and/or configuration of compressors and turbines. Although not depicted, the exemplary engine 100 may include various engine systems, such as an engine lubrication oil system, etc.

Referring particular to the fuel oxygen reduction unit 202 of the exemplary fuel delivery system 200, the fuel oxygen reduction unit 202 of FIG. 2 generally includes a contactor 204 and a fuel gas separator 206. Additionally, the exemplary fuel oxygen reduction unit 202 defines a circulation gas flowpath 208 extending from the fuel gas separator 206 to the contactor 204. In certain exemplary embodiments, the circulation gas flowpath 208 may be formed of any combination of one or more conduits, tubes, pipes, etc., as well as structures of components within the circulation gas flowpath 208.

As will be explained in greater detail, below, the fuel oxygen reduction unit 202 generally provides for a flow of stripping gas 210 through the circulation gas flowpath 208 during operation. It will be appreciated that the term "stripping gas" is used herein as a term of convenience to refer to a gas generally capable of performing the functions described herein. The stripping gas 210 flowing through the stripping gas flowpath/circulation gas flowpath 208 may be an actual stripping gas functioning to strip oxygen from the fuel within the contactor 204, or alternatively may be a sparging gas bubbled through a liquid fuel to reduce an oxygen content of such fuel. For example, as will be discussed in greater detail below, the stripping gas 210 may be an inert gas, such as Nitrogen or Carbon Dioxide (CO2), an inert gas mixture, or some other gas or gas mixture having a relatively low oxygen content.

Figure 5:
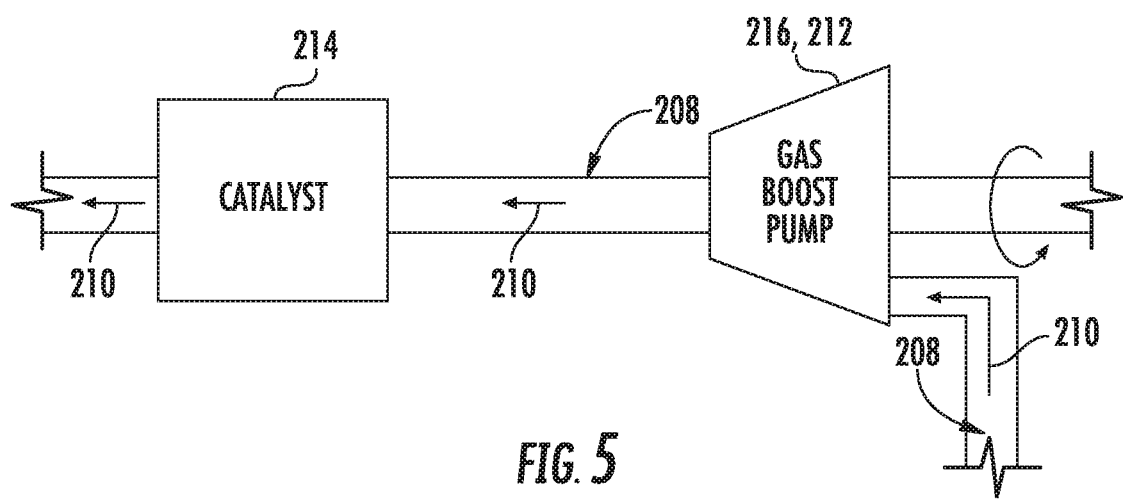
FIG. 5 is a schematic view of a preheater of a fuel oxygen reduction unit of a fuel delivery system in accordance with another exemplary embodiment of the present disclosure.

Moreover, for the exemplary fuel oxygen reduction unit 202 depicted in FIG. 2, the fuel oxygen reduction unit 202 further includes a gas boost pump 212, a gas oxygen reduction unit (which for the embodiment shown is a catalyst 214), and a pre-heater 216. For the embodiment shown, the gas boost pump 212, the catalyst 214, and the pre-heater 216 are each arranged in series flow within the circulation gas flowpath 208. The catalyst 214 is positioned in the circulation gas flowpath 208 for reducing an oxygen content of the flow of stripping gas 210 through the circulation gas flowpath 208, the pre-heater 216 is positioned in thermal communication with the circulation gas flowpath 208 upstream of the catalyst 214, and the gas boost pump 212 is positioned in airflow communication with the circulation gas flowpath 208 for increasing a pressure of the flow of stripping gas 210 to the circulation gas flowpath 208. Each of these components will be discussed in greater detail below. Further, it will be appreciated that in other embodiments, the listed components may be provided in any suitable flow order (see, e.g., discussion below with reference to FIG. 5). Moreover, in still other embodiments, the oxygen reduction unit 200 may not define the circulation gas flowpath 208, and instead a stripping gas flow may come from an open loop source.

Referring still to the embodiment depicted, the gas boost pump 212 is configured as a rotary gas pump mechanically coupled to, and driven by a power source, which for the embodiment shown is a first pad 217 of an accessory gearbox (such as accessory gearbox 142 of FIG. 1). Notably, as will be described in greater detail, below, the fuel gas separator 206 is similarly a mechanically-driven fuel gas separator mechanically coupled to, and driven by, a power source. For the embodiment of FIG. 2, the power source driving the fuel gas separator 206 is the same power source driving the gas boost pump 212, and more specifically, the gas boost pump 212 and fuel gas separator 206 are mechanically linked through a shaft 220. However, in other embodiments, the gas boost pump 212 and fuel gas separator 206 may be configured in any other suitable manner. For example, in other embodiments, the gas boost pump 212 may be mechanically separate from the fuel gas separator 206 and driven by an independent power source. Further, in one or more exemplary aspects of the present disclosure, the gas boost pump 212, the fuel gas separator 206, or both may be driven by any other suitable power source, such as an electric machine, a hydraulic or pneumatic motor, etc.

As will be explained in more detail below, for the embodiment of FIG. 2, it will be appreciated that the fuel gas separator 206 generally defines a gas outlet 222, a liquid fuel outlet 224, and an inlet 226. Additionally, the exemplary fuel delivery system 200 generally includes a plurality of fuel lines, and in particular, an inlet fuel line 228 and an outlet fuel line 230. The inlet fuel line 228 is fluidly connected to the contactor 204 for providing a flow of liquid fuel to the contactor 204 (e.g., from a fuel source 235, such as a fuel tank). Additionally, the liquid fuel outlet 220 of the fuel gas separator 206 is fluidly connected to the outlet fuel line 230. In such a manner, the outlet fuel line 230 may receive a deoxygenated flow of liquid fuel 232, as will also be described in greater detail below.

During typical operations, a stripping gas 210 flows from the gas outlet 218 of the fuel gas separator 206, through the circulation gas flowpath 208 in a direction from the fuel gas separator 206 to the contactor 204. More specifically, during typical operations, stripping gas 210 flows from the gas outlet 218 of the fuel gas separator 206, through, for the embodiment depicted, a pre-heater 216 configured to add heat energy to the gas flowing therethrough (as is explained in more detail below), and to/through the catalyst 214. The stripping gas 210 then flows through the gas boost pump 212, wherein a pressure of the stripping gas 210 is increased to provide for the flow of the stripping gas 210 through the circulation gas flowpath 208. The relatively high pressure stripping gas 210 (i.e., relative to a pressure upstream of the boost pump 208 and the fuel entering the contactor 204) is then provided to the contactor 204, wherein the stripping gas 210 is mixed with a flow of liquid fuel 232 from the inlet fluid line 228 to generate a fuel gas mixture 228. The fuel gas mixture 228 generated within the contactor 204 is provided to the inlet 222 of the fuel gas separator 206.

Generally, it will be appreciated that during operation of the fuel oxygen reduction unit 202, the liquid fuel 232 provided through the inlet fuel line 228 to the contactor 204 may have a relatively high oxygen content. The stripping gas 210 provided to the contactor 204 may have a relatively low oxygen content or other specific chemical structure. Within the contactor 204, the liquid fuel 232 is mixed with the stripping gas 210, resulting in the fuel gas mixture 228. As a result of such mixing a physical exchange may occur whereby at least a portion of the oxygen within the fuel 230 is transferred to the stripping gas 210, such that the fuel component of the mixture 228 has a relatively low oxygen content (as compared to the fuel 230 provided through inlet fuel line 228) and the stripping gas 210 component of the mixture 228 has a relatively high oxygen content (as compared to the stripping gas 210 provided through the circulation gas flowpath 208 to the contactor 204).

Within the fuel gas separator 206 the relatively high oxygen content stripping gas 210 is generally separated from the relatively low oxygen content fuel 230. As noted above, the exemplary fuel gas separator 206 of FIG. 2 is generally configured as a mechanical fuel gas separator. Accordingly, the fuel gas separator 206 may include one or more paddles or other structures configured to rotate to centrifuge and separate the relatively heavy liquid fuel 232 from the relatively light stripping gas 210 resulting in separate streams of liquid fuel 232 provided through the liquid fuel outlet 224 and stripping gas 210 provided through the stripping gas outlet 222. Notably, however, in other embodiments, any other suitable structure or configuration may be provided for the fuel gas separator 206 capable of separating the fuel gas mixture received through the fuel gas mixture inlet 226 from the contactor 204 into separate streams of liquid fuel 232 and stripping gas 210.

Accordingly, it will be appreciated that the liquid fuel 232 provided to the liquid fuel outlet 224, having interacted with the stripping gas 210, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 230 provided to the liquid fuel outlet 224 may an oxygen content of less than about five (5) parts per million ("ppm"), such as less than about three (3) ppm, such as less than about two (2) ppm, such as less than about one (1) ppm, such as less than about 0.5 ppm.

Referring still to the schematic view of the fuel oxygen reduction unit 202 in FIG. 2, it will further be appreciated that the exemplary fuel oxygen reduction unit 202 recirculates and reuses the stripping gas 210 (i.e. the stripping gas 210 operates in a substantially closed loop). However, the stripping gas 210 exiting the fuel gas separator 206, having interacted with the liquid fuel 232, may have a relatively high oxygen content. Accordingly, in order to reuse the stripping gas 210, an oxygen content of the stripping gas 210 from the gas outlet 218 of the fuel gas separator 206 needs to be reduced. For the embodiment depicted, as noted above, the stripping gas 210 flows through the pre-heater 216 to the catalyst 214, where the oxygen content of the stripping gas 210 is reduced. More specifically, within the catalyst 214, the relatively oxygen-rich stripping gas 210 is reacted to reduce the oxygen content thereof. It will be appreciated that catalyst 214 may be configured in any suitable manner to perform such functions. For example, in certain embodiments, the catalyst 214 may be configured to react the fuel-vapor rich stripping gas 210 with elements inside the catalyst 214 to provide a relatively oxygen-free stripping gas 210 upon exit. For example, the catalyst 214 may include geometries of catalytic components through which the relatively oxygen-rich stripping gas 210 flows to reduce the oxygen content thereof. Further, in other embodiments any other suitable gas oxygen reduction unit may be provided for reducing an oxygen content of the stripping gas 210. For example, in addition to, or in the alternative, the gas oxygen reduction unit may utilize a membrane oxygen reduction system, a combustion reduction system, a plasma reduction system, etc.

In one or more of these embodiments, the gas oxygen reduction unit/catalyst 214 may be configured to reduce an oxygen content of the stripping gas 210 by between about twenty-five percent (25%) by mass and about ninety-nine percent (99%) by mass, such as to less than about three percent (3%) oxygen (O2) by mass, such as to less than about one percent (1%) oxygen (O2) by mass.

The resulting relatively low oxygen content gas is then provided through the remainder of the circulation gas flowpath 208 and back to the contactor 204, such that the cycle may be repeated. In such a manner, it will be appreciated that the stripping gas 210 may be any suitable gas capable of undergoing the transitions described above. For example, the stripping gas 210 may be air from, e.g., a core air flowpath of a gas turbine engine including the fuel oxygen reduction unit 202 (e.g., compressed air bled from an HP compressor 112; see FIG. 1). However, in other embodiments, the stripping gas 210 may additionally, or alternatively, be any other suitable gas, such as an inert gas, such as Nitrogen or Carbon Dioxide (CO2), an inert gas mixture, or some other gas or gas mixture having a relatively low oxygen content.

Briefly, referring back to the pre-heater 216, it will be appreciated that the catalyst 214 may define a minimum light off temperature (also referred to as an activation temperature) for the stripping gas 210, such that when the stripping gas 210 is below this temperature the catalyst 214 may not operate as desired. In at least certain exemplary embodiments, the minimum light off temperature may be between about 350 degrees Fahrenheit and about 550 degrees Fahrenheit. Accordingly, the pre-heater 216 is configured to heat the stripping gas 210 within the circulation gas flowpath 208 to the minimum light off temperature, or to a temperature above the minimum light off temperature. In at least certain exemplary embodiments, the pre-heater 216 may be an electric heater or a heat exchanger. Specifically, for the embodiment shown, the pre-heater 216 is configured as an electric heater electrically coupled to an electric power source 236. For example, the electric heater may be an electric resistance heater positioned in the circulation gas flowpath 208 to add heat to the flow of stripping gas 210 through the circulation gas flowpath 208. Further, as will be appreciated from the discussion below relating to the control system 254, in certain embodiments, the pre-heater 216 may be configured to provide a varying amount of heat to the flow of stripping gas 210 through the circulation gas flowpath 208 based on, e.g., a temperature of the flow of stripping gas 210 immediately upstream of the pre-heater 216, a temperature of the flow of stripping gas 210 immediately downstream of the pre-heater 216, or other suitable operating parameters.

By way of example, in one or more exemplary embodiments, the pre-heater 216 may be configured to increase a temperature of the stripping gas 210 by at least about fifty degrees Fahrenheit, such as by at least about seventy-five degrees Fahrenheit, such as up to about five hundred degrees Fahrenheit.

Figure 3:
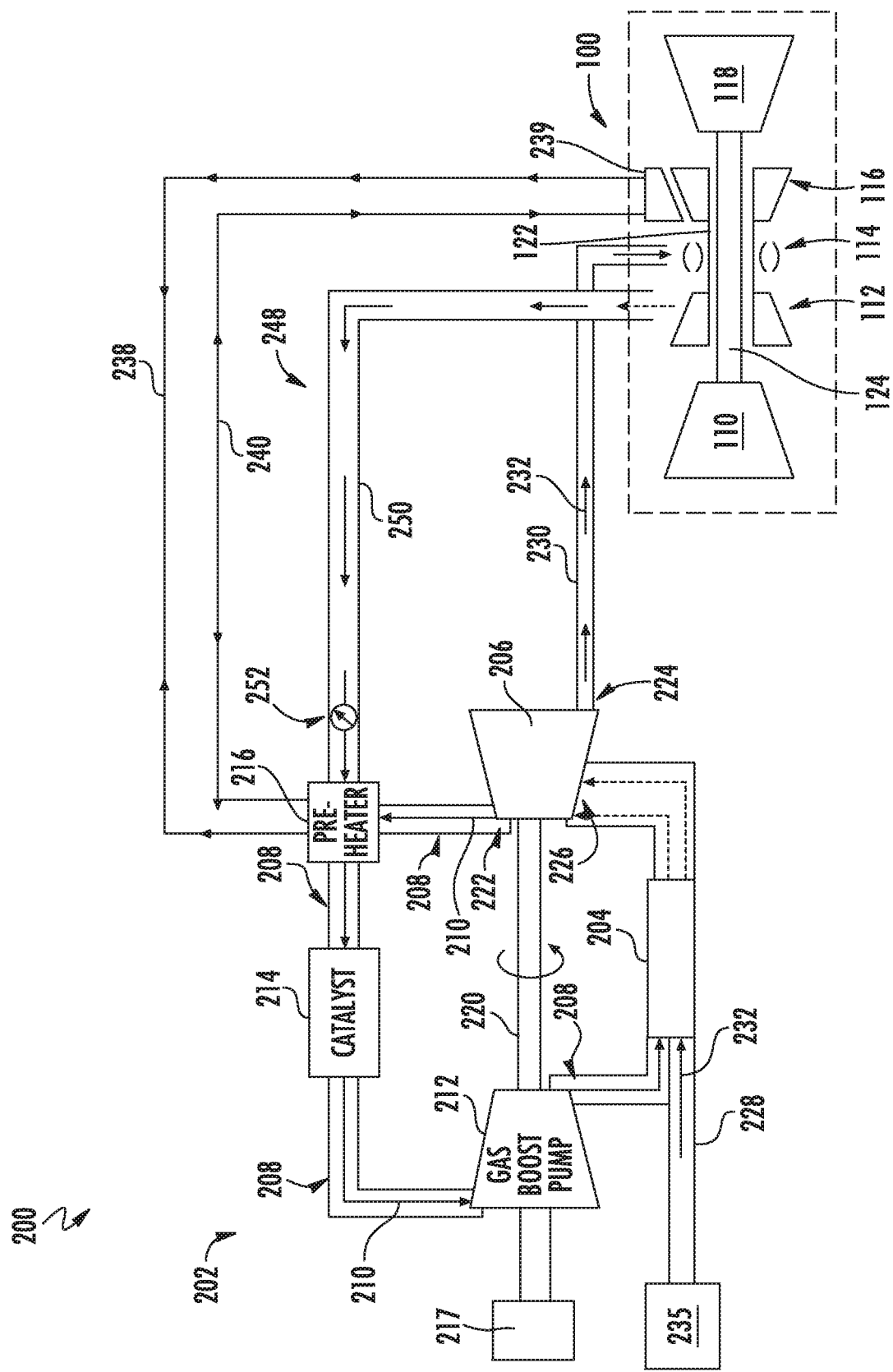
FIG. 3 is a schematic view of a fuel delivery system in accordance with another exemplary embodiment of the present disclosure.

It will be appreciated, however, that in other exemplary embodiments, any other suitable type or configuration of pre-heater 216 may be provided. For example, referring now briefly to FIG. 3, a schematic view of a fuel delivery system 200 and engine 100 in accordance with another exemplary embodiment is provided. The exemplary fuel delivery system 200 and engine 100 of FIG. 3 may be configured in substantially the same manner as exemplary system 200 and engine 100 described above with reference FIG. 2. For example, the exemplary system 200 of FIG. 3 includes a fuel oxygen reduction unit 202, with the fuel oxygen reduction unit 202 defining a circulation gas flowpath 208 and including a catalyst 214 and a pre-heater 216.

As with the embodiment of FIG. 2, the pre-heater 216 is positioned in thermal communication with the circulation gas flowpath 208 upstream of the catalyst 214 (and downstream of a fuel gas separator 206). However, for the embodiment of FIG. 3, the pre-heater 216 is instead configured as a heat exchanger. The exemplary heat exchanger of FIG. 3 may be in thermal communication with any suitable heat source, such as any suitable engine and/or aircraft heat source. Specifically, for the embodiment shown, the heat exchanger is in thermal communication with at least one of an engine system or an engine flowpath, such as a core air flowpath of the engine 100 (see, e.g., core air flowpath 121 of FIG. 1). More specifically, for the embodiment shown, the heat exchanger/pre-heater 216 is fluidly connected to a first flowpath 238 configured to provide a flow of thermal fluid from a flowpath heat exchanger 239 (the flowpath heat exchanger 239 being thermally coupled to the flowpath of the engine 100) to the heat exchanger/pre-heater 216 and a second flowpath 240 configured to return the flow of thermal fluid from the heat exchanger/pre-heater 216 to the flowpath of the engine 100. The flowpath heat exchanger 239 may be configured to extract heat from the engine flow path. Notably, however, in other embodiments, the first and second flowpaths 238, 240 may instead be configured to provide and return a flow of lubrication oil to and from, e.g., a lubrication oil system of the engine 100. Additionally, or alternatively, in other embodiments, the heat exchanger may be thermally coupled to an intermediate thermal transfer system, which is in turn thermally coupled to one or more systems of the engine 100, or a flowpath of the engine 100.

Figure 4:
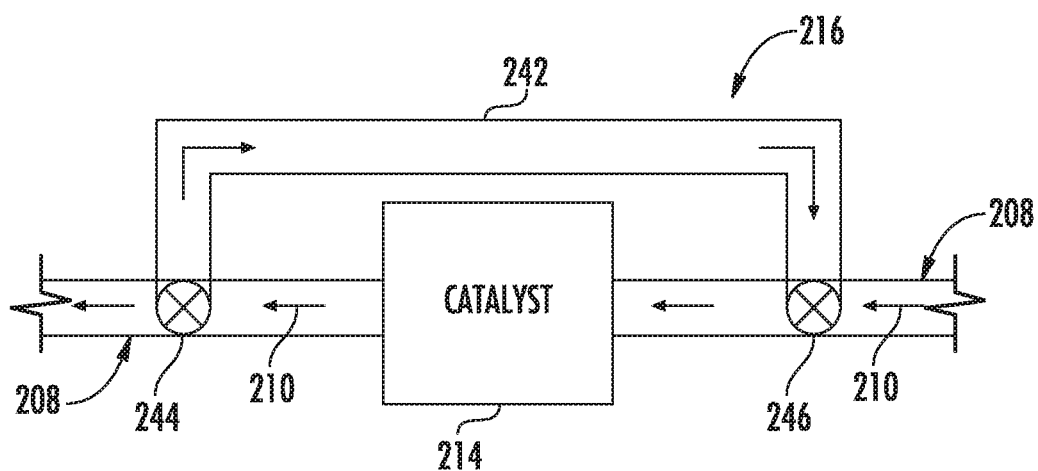
FIG. 4 is a schematic view of a preheater of a fuel oxygen reduction unit of a fuel delivery system in accordance with an exemplary embodiment of the present disclosure.

Additionally, in still other embodiments, the pre-heater 216 may have any other suitable configuration. For example, referring now briefly to FIG. 4, a schematic view is depicted of a catalyst 214 and pre-heater 216 of a fuel oxygen reduction unit 202 in accordance with another exemplary embodiment of the present disclosure, as may be incorporated into, e.g., the exemplary fuel oxygen reduction unit 202 described above with reference to FIG. 2. For the embodiment shown, the pre-heater 216 is positioned in thermal communication with a circulation gas flowpath 208 of the fuel oxygen reduction unit 202 at a location upstream of the catalyst 214. More specifically, for the embodiment shown, the pre-heater 216 is configured as a recirculating flowpath in airflow communication with circulation gas flowpath 208 downstream of the catalyst 214, and further in airflow communication with the circulation gas flowpath 208 upstream of the catalyst 214. Specifically, for the embodiment shown, the recirculating flowpath includes a recirculating duct 242, a downstream valve 244, and an upstream valve 246. The recirculating duct 242 extends from the downstream valve 244 (positioned in airflow communication with the circulation gas flowpath 208 downstream of the catalyst 214) to the upstream valve 246 (positioned in airflow communication with the circulation gas flowpath 208 upstream of the catalyst 214). In such a manner, the recirculating duct 242 of the recirculating flowpath may provide at least a portion of the air downstream of the catalyst 214, which may have been combusted or otherwise heated through operation of the catalyst 214, to a location upstream of the catalyst 214 to increase an overall temperature of the flow of stripping gas 210 through the circulation gas flowpath 208 prior such flow stripping gas 210 being provided to the catalyst 214.

One or both of the upstream and downstream valves 246, 244 may be a variable throughput valve configured to vary an amount of gas allowable therethrough. Additionally, one or both of the upstream and downstream valves 246, 244 may be operatively coupled to a control system for varying the amount of gas through the recirculating duct 242 in response to, e.g., one or more operating parameters of the fuel oxygen reduction unit 202 and or engine 100.

Further, in still other embodiments of the present disclosure, the pre-heater 216 may have still other suitable configurations. For example, referring now briefly to FIG. 5, a schematic view is depicted of a catalyst 214 and a pre-heater 216 of a fuel oxygen reduction unit 202 in accordance with yet another exemplary embodiment of the present disclosure, as may be incorporated into the exemplary fuel oxygen reduction unit 202 of FIG. 2. Specifically, for the embodiment of FIG. 5, the pre-heater 216 is configured as a gas boost pump 212 positioned in airflow communication with the circulation gas flowpath 208 upstream of the catalyst 214 (and downstream of a fuel gas separator 206), and also, as will be appreciated, in thermal communication with the circulation gas flowpath 208 upstream of the catalyst 214. More specifically, the pre-heater 216/gas boost pump 212 may be configured to increase a pressure of the flow of stripping gas 210 through the circulation gas flowpath 208 upstream of the catalyst 214 (and downstream of the fuel gas separator 206). By increasing the pressure of the flow of stripping gas 210, the pre-heater 216/gas boost pump 212 may further increase a temperature of the flow stripping gas 210 to a temperature above the minimum light off temperature of the catalyst 214. With such an exemplary embodiment, the fuel oxygen reduction unit 202 may not include a separate gas boost pump downstream of the catalyst 214 and upstream of the contactor 204.

Referring now back to FIG. 2, it will be appreciated that during operation of the exemplary fuel oxygen reduction unit 202 at least a portion of the stripping gas 210 to the circulation gas flowpath 208 may be lost during, e.g., the separation process. Accordingly, the exemplary fuel oxygen reduction unit 202 depicted further includes a makeup gas assembly 248 in airflow communication with the circulation gas flowpath 208. More specifically, for the embodiment shown, the makeup gas assembly 248 is in airflow communication with the compressor section of the engine 100 and the circulation gas flowpath 208 upstream of the catalyst 214. For the embodiment depicted, the makeup gas assembly 248 is in airflow communication with the circulation gas flowpath 208 at the pre-heater 216 or upstream of the pre-heater 216 (and downstream of the fuel gas separator 206).

Referring particularly to the embodiment depicted in FIG. 2, the exemplary makeup gas assembly 248 is in airflow communication with the HP compressor 112 of the compressor section of the engine 100 such that the makeup gas assembly 248 is in airflow communication with the HP compressor 112 for receiving a bleed airflow from the HP compressor 112. For example, in certain embodiments, the makeup gas assembly 248 may be in airflow communication with the HP compressor 112 of the compressor section of the engine 100 at a location where the extracted makeup gas will define a pressure greater than an ambient pressure. Additionally, or alternatively, in certain exemplary aspects of the present disclosure, the HP compressor 112 may include at least four stages of HP compressor rotor blades (see stages 152 of FIG. 1) and the makeup gas assembly 248 may be in airflow communication with the HP compressor 112 at the fourth stage of the HP compressor 112 or downstream of the fourth stage of the HP compressor 112 (e.g., stage 152A of FIG. 1). For example, in certain exemplary aspects, the HP compressor 112 may include at least six stages of HP compressor rotor blades and the makeup gas assembly 248 may be in airflow communication with the HP compressor 112 at the sixth stage of the HP compressor 112 or downstream of the sixth stage of the HP compressor 112 (e.g., stage 152B of FIG. 1).

As will be discussed in greater detail, below, one benefit of using makeup gas from the above noted locations is the temperature of the makeup gas. However, with other compressors, a desired temperature may be reached at a further upstream position. For example, the HP compressor 112 may define a reference point where the airflow therethrough reaches a reference temperature during a given operating condition (e.g., cruise). With such a configuration, the makeup gas assembly 248 may be in airflow communication with the HP compressor 112 at the reference point or downstream of the reference point. The reference temperature may correspond to the minimum light off temperature for the catalyst 214. As such, the reference temperature may be equal to or greater than about 350 degrees Fahrenheit, about 375 degrees Fahrenheit, about 400 degrees Fahrenheit, or 450 degrees Fahrenheit, and up to about 2,000 degrees Fahrenheit. The reference point may be a particular stage of the HP compressor 112 (or other compressor), such as the fourth stage, or any other suitable stage.

The exemplary makeup gas assembly 248 depicted generally includes makeup gas duct 250 and a makeup gas valve 252. The makeup gas valve 252 may be a pressure differential valve positioned at least partially within the makeup gas duct 250. In such a manner, the pressure differential valve made operate to allow makeup gas through the makeup gas duct to the circulation gas flowpath 208 when a pressure within the circulation gas flowpath 208 falls below a predetermined threshold. For example, in certain embodiments, the pressure differential valve may be a poppet valve.

Briefly, it will be appreciated that although the exemplary makeup gas assembly 248 is depicted being in airflow communication with a location of the compressor section capable of providing the makeup gas flow at a sufficient pressure, in other embodiments, the makeup gas assembly 248 may instead be in airflow communication with the compressor section upstream of the locations depicted and described above (e.g., at an upstream stage of the HP compressor 112, at the LP compressor 110), or elsewhere, and include a separate, dedicated compressor for increasing a pressure of the makeup gas flow to a desired level. For example, the makeup gas assembly 248 may be configured to receive an airflow from a relatively low pressure source (e.g., the LP compressor 110, an ambient location, etc.) and include a dedicated compressor in airflow communication with the duct 250 for increasing a pressure of the makeup gas flow therethrough.

Referring still to the embodiment of FIG. 2, however, it will be appreciated that by utilizing the makeup gas assembly 248 to provide makeup gas to the circulation gas flowpath 208 from the HP compressor 112 of the compressor section of the engine 100, the makeup gas assembly 248 may further be adding heat to the stripping gas 210 within the circulation gas flowpath 208. Such may further assist with raising a temperature of the flow stripping gas 210 to the circulation gas flowpath 208 upstream of the catalyst 214 to a temperature equal to or above the minimum light off temperature for the catalyst 214. Further, by providing makeup gas to the circulation gas flowpath 208 from the compressor section of the engine 100, the makeup gas assembly 248 may be providing additional oxygen to the flow of stripping gas 210 through the circulation gas flowpath 208 upstream of the catalyst 214 which must additionally be reacted within the catalyst 214.

By way of example only, in certain exemplary embodiments, the fuel oxygen reduction unit 202 may lose between about 0.25 percent and about two (2) percent of the stripping gas 210 through the separation process. With such a configuration, the makeup gas assembly 248 may be configured to provide a makeup gas to the circulation gas flowpath 208 at a flow rate equal to between about 0.05 percent and about five (5) percent, such as between about 0.25 percent and about three (3) percent, of a maximum rated circulation gas flowpath flow rate. The "maximum rated circulation gas flowpath flow rate" refers to a flowrate of stripping gas 210 through the circulation gas flowpath 208 when the fuel oxygen reduction unit 202 is operating at a maximum rated speed and a designed amount of stripping gas 210 is present in the flowpath 208. Accordingly, in certain exemplary aspects, depending on, e.g., a size of the fuel oxygen reduction unit 202, the makeup gas assembly 248 may be configured to provide makeup gas to the circulation gas flowpath 208 at a flow rate of between about 0.0001 pounds per second and about 0.0025 pounds per second.

Referring still to FIG. 2, it will be appreciated that the exemplary fuel delivery system 200 and fuel oxygen reduction unit 202 further includes a control system 254. More specifically, the exemplary fuel delivery system 200 and fuel oxygen reduction unit 202 includes a plurality of sensors 256, such as a circulation gas flowpath flow sensor 256A positioned downstream of the fuel gas separator 206 and upstream of where the makeup gas assembly 248 meets the circulation gas flowpath 208; a first temperature sensor 256B configured to sense data indicative of a temperature of the flow of stripping gas 210 through the circulation gas flowpath 208 at a location upstream of the pre-heater 216; a second temperature sensor 256C configured to sense data indicative of a temperature of the flow stripping gas 210 through the circulation gas flowpath 208 at a location downstream of the pre-heater 216 and upstream of the catalyst 214; and a third temperature sensor 256D configured to sense data indicative of a temperature of the flow stripping gas 210 through the circulation gas flowpath 208 at a location downstream of the catalyst 214.

Further, the exemplary control system 254 includes a controller 258, with the controller 258 being operably connected to each of the one or more sensors 256, as well as the makeup gas valve 252 of the makeup gas assembly 248 and the pre-heater 216 (or rather, the power source 236 of the pre-heater 216). Specifically, the controller 258 generally includes a network interface 260. The network interface 260 may be operable with any suitable wired or wireless communications network for communicating data with other components of, e.g., the fuel delivery system 200/fuel oxygen reduction unit 202, the engine 100, and/or other components or systems not depicted. As is depicted using phantom lines in FIG. 2, for the embodiment depicted, the network interface 260 utilizes a wireless communication network 262 to communicate data with other components. Specifically, for the embodiment shown, through the network interface 260 of the controller 258 and the wireless communication network 262, the controller 258 is operably coupled to each of the one or more sensors 256, the variable throughput valve 240, and the pre-heater 216 (or rather the power source 236). It will be appreciated, of course, that although the network interface 260 utilizes the wireless communication network 262 for the embodiment of FIG. 2, in other embodiments, the network interface 260 may instead utilize a wired communication network, or a combination of wired and wireless communication networks.

Referring still to FIG. 2, the controller 258 further includes one or more processors 264 and memory 266. The memory 266 stores data 268 and instructions 270 accessible by the one or more processors 264. The one or more processor(s) 264 can include any suitable processing device, such as a microprocessor, microcontroller, integrated circuit, logic device, and/or other suitable processing device. The one or more memory device(s) 266 can include one or more computer-readable media, including, but not limited to, non-transitory computer-readable media, RAM, ROM, hard drives, flash drives, and/or other memory devices. The instructions 270, when executed by the one or more processors 264, cause the system 204 to perform functions. The instructions 270 within the memory 266 can be any set of instructions that when executed by the one or more processor(s) 264, cause the one or more processor(s) 264 to perform operations, such as one or more of the operations described herein. In certain exemplary embodiments, the instructions 270 within the memory 266 can be software written in any suitable programming language or can be implemented in hardware. Additionally, and/or alternatively, the instructions can be executed in logically and/or virtually separate threads on processor(s) 264. The memory device(s) 266 can further store other data 270 that can be accessed by the processor(s) 264.

In such a manner, it will be appreciated that in at least certain exemplary embodiments, the controller 258 may be configured to receive data from the one or more sensors 256, and may control operations of the fuel oxygen reduction unit 202 in response to the data received from the one or more sensors 256. For example, the exemplary controller 258 may be configured to operate the makeup gas valve 252 in response to data received from the flow rate sensor 256A (e.g., increase a flow of makeup gas in response to receiving data indicative of a relatively low flow rate of stripping gas 210 through the circulation gas flowpath 208, or decrease a flow of makeup gas based on data indicative of a relatively high flow rate of stripping gas 210 through the circulation gas flowpath 208). Additionally, or alternatively, the exemplary controller 258 may be configured to operate the pre-heater 216 (and/or the makeup gas assembly 248/gas valve 252) in response to receiving data indicative of a temperature of the flow of stripping gas 210 to the circulation gas flowpath 208 upstream of the pre-heater 216, downstream of the pre-heater 216 and upstream of the catalyst 214, and/or downstream of the catalyst 214. Additionally, or alternatively, the controller 258 may be configured to perform one or more the operations described below with reference to FIG. 6.

It will be appreciated, however, that the exemplary fuel oxygen reduction unit 202 described above is provided by way of example only. In other embodiments, the fuel oxygen reduction unit 202 may be configured in any other suitable manner.

Figure 6:
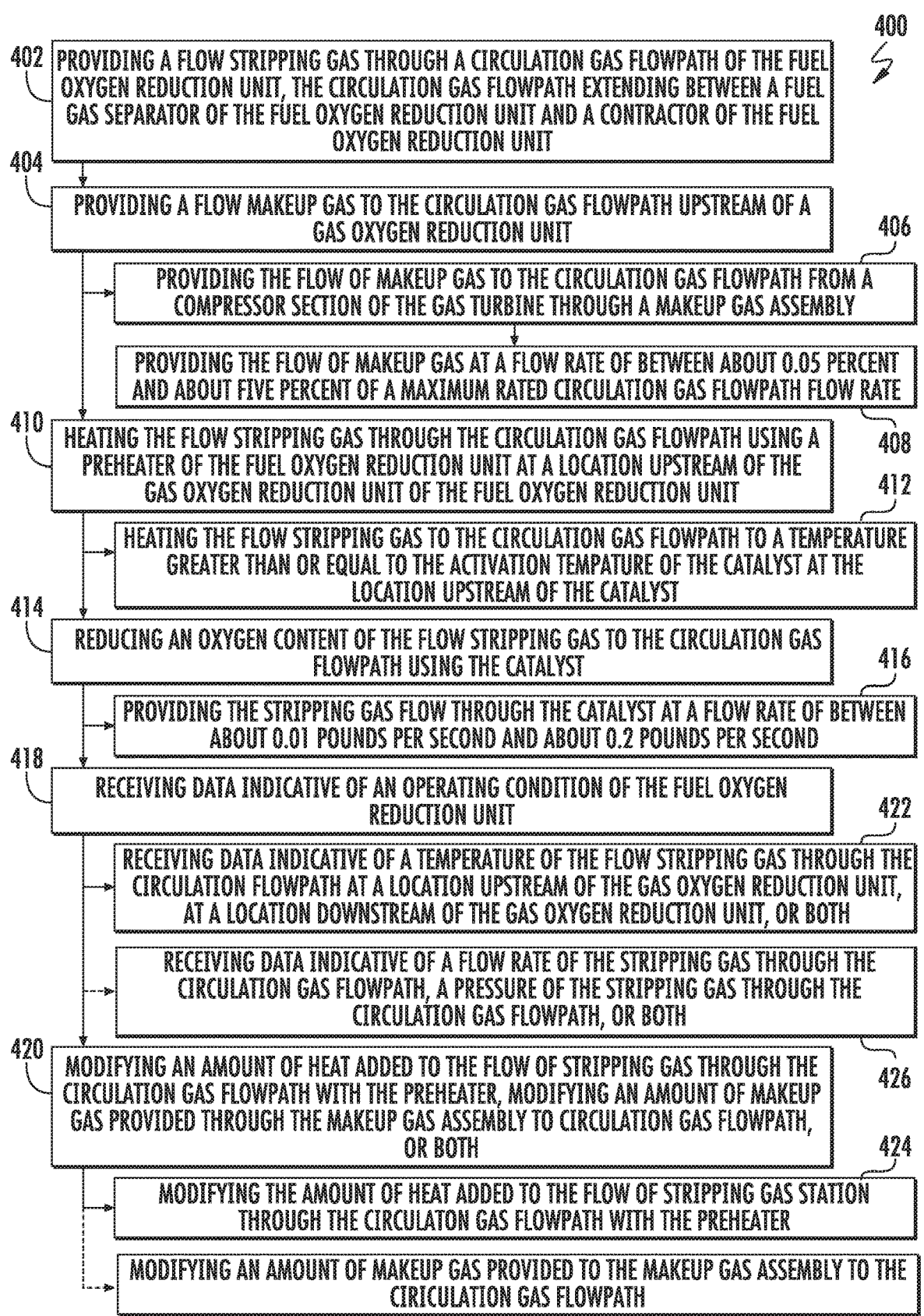
FIG. 6 is flow diagram of a method for operating a fuel oxygen reduction unit in accordance with an exemplary embodiment of the present disclosure.

Referring now to FIG. 6, a flow diagram is provided of a method 400 for operating a fuel oxygen reduction unit of a gas turbine engine in accordance with an exemplary aspect of the present disclosure. In at least certain exemplary aspects, the method 400 may be utilized to operate one or more of the exemplary fuel delivery systems and fuel oxygen reduction units described above with reference to FIGS. 1 through 5.

For the exemplary aspect depicted, the method 400 generally includes at (402) providing a flow stripping gas through a circulation gas flowpath of the fuel oxygen reduction unit, the circulation gas flowpath extending between a fuel gas separator of the fuel oxygen reduction unit and a contactor of the fuel oxygen reduction unit.

Additionally, the exemplary method 400 includes at (404) providing a flow of makeup gas to the circulation gas flowpath upstream of a gas oxygen reduction unit. More specifically, for the exemplary aspect depicted, providing the flow of makeup gas to the circulation gas flowpath at (404) includes at (406) providing the flow of makeup gas to the circulation gas flowpath from a compressor section of the gas turbine engine through a makeup gas assembly. For example, in certain exemplary aspects, providing the flow of makeup gas to the circulation gas flowpath from the compressor section at (406) may include providing the flow of makeup gas from a high pressure compressor of the compressor section of the gas turbine engine. Further, for the exemplary aspect depicted, providing the flow of makeup gas to the circulation gas flowpath at (406) includes at (408) providing the flow of makeup gas at a flow rate of between about 0.05 percent and about five percent of a maximum rated circulation gas flowpath flow rate. As discussed above, such may correspond (depending on the size and efficiency of the fuel oxygen reduction unit) to a flow rate between about 0.0001 pounds per second and about 0.0025 pounds per second.

Moreover, referring still to FIG. 6, the exemplary method 400 further includes at (410) heating the flow stripping gas through the circulation gas flowpath using a preheater of the fuel oxygen reduction unit at a location upstream of the gas oxygen reduction unit of the fuel oxygen reduction unit. More specifically, for the exemplary aspect depicted, the gas oxygen reduction unit is a catalyst defining a minimum light off temperature/activation temperature, and heating the flow stripping gas using the preheater at (410) includes at (412) heating the flow stripping gas to the circulation gas flowpath to a temperature greater than or equal to the activation temperature of the catalyst at the location upstream of the catalyst.

Further, the exemplary method 400 includes at (414) reducing an oxygen content of the flow stripping gas to the circulation gas flowpath using the catalyst. For the exemplary aspect shown, reducing the oxygen content of the flow stripping gas to the circulation gas flowpath utilizing the catalyst at (414) includes at (416) providing the stripping gas flow through the catalyst at a flow rate of between about 0.01 pounds per second and about 0.2 pounds per second.

Further, still, for the exemplary aspect depicted, the exemplary fuel delivery system and fuel oxygen reduction unit may include a control system having one or more sensors and a controller. With such an exemplary aspect, the method 400 further includes at (418) receiving data indicative of an operating condition of the fuel oxygen reduction unit and at (420) modifying an amount of heat added to the flow of stripping gas through the circulation gas flowpath with the preheater, modifying an amount of makeup gas provided through the makeup gas assembly to circulation gas flowpath, or both.

More specifically, for the exemplary aspect depicted, receiving data indicative of the operating condition at (418) includes at (422) receiving data indicative of a temperature of the flow stripping gas through the circulation gas flowpath at a location upstream of the gas oxygen reduction unit, at a location downstream of the gas oxygen reduction unit, or both. Further, modifying the amount of heat added to the flow of stripping gas through the circulation gas flowpath with the preheater, modifying an amount of makeup gas provided through the makeup gas assembly to circulation gas flowpath, or both at (420) includes at (424) modifying the amount of heat added to the flow of stripping gas through the circulation gas flowpath with the preheater.

Notably, however, in other exemplary aspects, as depicted in phantom, receiving data indicative of the operating condition at (418) may include at (426) receiving data indicative of a flow rate of the stripping gas through the circulation gas flowpath, a pressure of the stripping gas through the circulation gas flowpath, or both. Further, with such an exemplary aspect, modifying the amount of heat added to the flow of stripping gas through the circulation gas flowpath with the preheater, modifying an amount of makeup gas provided to the makeup gas assembly to circulation gas flowpath, or both at (420) may include at (428) modifying an amount of makeup gas provided to the makeup gas assembly to circulation gas flowpath.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a fuel oxygen reduction unit of a gas turbine engine comprising a combustion section and a fuel delivery system in fluid communication with the combustion section for providing fuel to the combustion section, wherein the fuel delivery system comprising comprises a fuel oxygen reduction unit defining a circulation gas flowpath, and wherein the fuel oxygen reduction unit comprises:
  a fuel gas separator that separates a fuel gas mixture into a flow of liquid fuel and a flow of stripping gas,
  a gas oxygen reduction unit positioned in the circulation gas flowpath and comprising a gas inlet configured to intake the flow of stripping gas from the fuel gas separator without liquid fuel and reduce an oxygen content of the flow of stripping gas in the circulation gas flowpath; and
  a pre-heater positioned in thermal communication with the circulation gas flowpath between the fuel gas separator and the gas oxygen reduction unit downstream of the fuel gas separator and upstream of the gas oxygen reduction unit so as to heat the flow of stripping gas flowing into the gas oxygen reduction unit, wherein the method comprises:
  providing the flow of stripping gas through the circulation gas flowpath of the fuel oxygen reduction unit, the circulation gas flowpath extending between the fuel gas separator of the fuel oxygen reduction unit and a contactor of the fuel oxygen reduction unit; and
  heating the flow of stripping gas using the pre-heater of the fuel oxygen reduction unit at a location upstream of the gas oxygen reduction unit of the fuel oxygen reduction unit.

2. The method of claim 1, further comprising:
providing a flow of makeup gas to the circulation gas flowpath upstream of the gas oxygen reduction unit.

3. The method of claim 2, wherein providing the flow of makeup gas to the circulation gas flowpath comprises providing the flow of makeup gas to the circulation gas flowpath from a compressor section of the gas turbine engine through a makeup gas assembly.

4. The method of claim 2,
wherein the fuel oxygen reduction unit defines a maximum rated circulation gas flowpath flow rate, and
wherein providing the flow of makeup gas to the circulation gas flowpath comprises providing a flow of makeup gas at a flow rate of between about 0.05 percent and about five percent of the maximum rated circulation gas flowpath flow rate.

5. The method of claim 2, further comprising:
receiving data indicative of an operating condition of the fuel oxygen reduction unit; and
modifying an amount of heat added to the flow of stripping gas through the circulation gas flowpath with the pre-heater, modifying an amount of makeup gas provided by the makeup gas assembly to circulation gas flowpath, or both.

6. The method of claim 1,
wherein the gas oxygen reduction unit is a catalyst, and
wherein the method further comprises:
  reducing an oxygen content of the flow of stripping gas through the circulation gas flowpath utilizing the catalyst, and
wherein reducing the oxygen content of the flow of stripping gas through the circulation gas flowpath utilizing the catalyst comprises providing the flow of stripping gas through the catalyst at a flow rate of between about 0.01 pounds per second and about 0.2 pounds per second.

7. The method of claim 1,
wherein the gas oxygen reduction unit is a catalyst,
wherein the catalyst defines an activation temperature,
wherein heating the flow of stripping gas using the pre-heater comprises heating the flow stripping gas of to a temperature greater than or equal to the activation temperature at a location upstream of the catalyst.

8. An engine comprising:
a combustion section; and
a fuel delivery system in fluid communication with the combustion section for providing fuel to the combustion section,
wherein the fuel delivery system comprises a fuel oxygen reduction unit defining a circulation gas flowpath, and
wherein the fuel oxygen reduction unit comprises:
- a fuel gas separator that separates a fuel gas mixture into a flow of liquid fuel and a flow of stripping gas,
- a gas oxygen reduction unit positioned in the circulation gas flowpath and comprising a gas inlet configured to intake the flow of stripping gas from the fuel gas separator without liquid fuel and reduce an oxygen content of the flow of stripping gas in the circulation gas flowpath; and
- a pre-heater positioned in thermal communication with the circulation gas flowpath between the fuel gas separator and the gas oxygen reduction unit downstream of the fuel gas separator and upstream of the gas oxygen reduction unit so as to heat the flow of stripping gas flowing into the gas oxygen reduction unit.

9. The engine of claim 8, further comprising:
a compressor section,
wherein the fuel oxygen reduction unit further comprises a makeup gas assembly in airflow communication with the compressor section of the engine and the circulation gas flowpath upstream of the gas oxygen reduction unit, and
wherein the pre-heater comprises a makeup gas inlet that intakes makeup gas from the compressor section of the engine, and a stripping gas inlet for intaking the stripping gas without liquid fuel.

10. The engine of claim 9,
wherein the compressor section comprises a low pressure compressor and a high-pressure compressor,
wherein the makeup gas assembly is in airflow communication with the high-pressure compressor for receiving a bleed airflow from the high-pressure compressor.

11. The engine of claim 10,
wherein the high-pressure compressor defines a reference point where an airflow therethrough reaches a reference temperature during operation,
wherein the makeup gas assembly is in airflow communication with the high-pressure compressor at the reference point of the high-pressure compressor or downstream of the reference point of the high-pressure compressor, and
wherein the reference temperature is greater than or equal to 350 degrees Fahrenheit.

12. The engine of claim 10,
wherein the high-pressure compressor comprises at least four stages, and
wherein the makeup gas assembly is in airflow communication with the high-pressure compressor at the fourth stage of the high-pressure compressor or downstream of the fourth stage of the high-pressure compressor.

13. The engine of claim 9, wherein the makeup gas assembly is in airflow communication with the circulation gas flowpath at the pre-heater or upstream of the pre-heater.

14. The engine of claim 8, wherein the pre-heater comprises an electric heater or a heat exchanger.

15. The engine of claim 8,
wherein the pre-heater comprises a heat exchanger,
wherein a compressor section and the combustion section of the engine together define at least in part an engine flowpath, and
wherein the heat exchanger is further in thermal communication with the engine flowpath or an engine system.

16. The engine of claim 8,
wherein the gas oxygen reduction unit is a catalyst,
wherein the pre-heater comprises a recirculating flowpath in airflow communication with the circulation gas flowpath downstream of the catalyst and the circulation gas flowpath upstream of the catalyst.

17. The engine of claim 8, wherein the pre-heater is configured as a gas boost pump.

18. The engine of claim 8,
wherein the gas oxygen reduction unit is a catalyst,
wherein the fuel oxygen reduction unit further comprises a gas boost pump in airflow communication with the circulation gas flowpath at a location downstream of the catalyst, and
wherein the gas boost pump is configured to pump the flow of stripping gas without liquid fuel.

19. The engine of claim 8,
wherein the gas oxygen reduction unit is a catalyst,
wherein the fuel oxygen reduction unit further comprises a contactor,
wherein the contactor is in airflow communication with the circulation gas flowpath at a location downstream of the catalyst and is in fluid communication with a liquid fuel inlet line, and
wherein the fuel gas separator is in fluid communication with the contactor and is in airflow communication with the circulation gas flowpath at a location upstream of the catalyst.

20. The engine of claim 8,
wherein the fuel oxygen reduction unit further comprises a makeup gas assembly in airflow communication with the circulation gas flowpath upstream of the gas oxygen reduction unit,
wherein the makeup gas assembly comprises a makeup gas valve, and
wherein the makeup gas valve is a pressure differential valve.

* * * * *